United States Patent [19]

Suda

[11] Patent Number: 4,765,725
[45] Date of Patent: Aug. 23, 1988

[54] IMAGING SINGLE LENS
[75] Inventor: Shigeyuki Suda, Tokyo, Japan
[73] Assignee: Canon Kabushiki Kaisha, Tokyo, Japan
[21] Appl. No.: 785,617
[22] Filed: Oct. 9, 1985
[30] Foreign Application Priority Data
Oct. 15, 1984 [JP] Japan ............... 59-214405
[51] Int. Cl.$^4$ .............................. G02B 3/02
[52] U.S. Cl. .................................. 350/432
[58] Field of Search ........................ 350/432
[56] References Cited
U.S. PATENT DOCUMENTS
934,579 9/1909 Straubel et al. .......... 350/432
4,415,238 11/1983 Braat et al. .
4,449,792 5/1984 Arai et al. .
4,657,352 4/1987 Suda et al. .

FOREIGN PATENT DOCUMENTS
76512A 5/1982 Japan .

Primary Examiner—John K. Corbin
Assistant Examiner—Rebecca D. Gass
Attorney, Agent, or Firm—Fitzpatrick, Cella, Harper & Scinto

[57] ABSTRACT

An imaging single lens in which perfectly, a first surface is an axis-symmetrical non-spherical surface having a radius of curvature $r_1$ in the vicinity of the optical axis, a second surface is a convex spherical surface having a radius of curvature $r_2$, the center thickness is d, the non-spherical shape of the first surface is a shape displaced outwardly from the central portion to the marginal portion relative to a reference spherical surface of radius $r_1$, and as $p \equiv -r_2/d$, p is 1 or a value approximate to 1.

11 Claims, 11 Drawing Sheets

IMAGING SINGLE LENS

BACKGROUND AND SUMMARY OF THE INVENTION

This invention relates to an imaging single lens, and in particular to an imaging single lens having a non-spherical surface which is suitably used where the light used is substantially monochromatic.

Optical information recording has become widely used as one of information recording methods. As an example of the optical information recording, mention may be made of a method of the type in which a number of two kinds of recording pits different in light reflectance are formed as binary-encoded digital signal rows on a recording medium such as a disc, a card or a tape. During the reproduction of such optically recorded information, the recording medium is illuminated by a suitable light source, the light from the recording pits of the recording medium is imaged on a photosensor by an imaging optical system, and the imaging optical system and the photosensor are moved relative to the recording medium, whereby a reproduction signal can be time-serially obtained from the photosensor.

Where a card is used as the information recording medium, a number of rows comprising a plurality of recording pits are arranged and formed and during reproduction, the light from a pit row is imaged on a photosensor, for example, a one-dimensional CCD, by an imaging optical system, whereby simultaneous reading of a pit row is effected. Therefore, the imaging optical system is required to have a good imaging performance over a relatively wide field of view.

Now, in the optical information recording as described above, the information recording density can be made very great and accordingly, in order to actually enhance the recording density, each recording pit is formed very small while, on the other hand, the arrangement pitch of the picture elements of the sensor is greater than the arrangement pitch of the recording pits. Therefore, as the imaging optical system, use has heretofore been generally made of an enlarging system such as a microscope objective lens of magnification of the order of 3-20 times.

However, in the microscope objective lens, correction of chromatic aberration is usually effected in the wavelength range of 400-700 nm so that the lens may display a good performance under white illumination such as that of a halogen lamp, and therefore, the number of lenses used is great and the dimensions of the entire lens system are larger than might be desirable.

However, the light source used during the reproduction of the optically recorded information as described above is a substantially monochromatic light source such as a semiconductor laser or a light-emitting diode and therefore, using a microscope objective lens as the imaging optical system is of excessive quality relative to the purpose, and a microscope objective lens of suitable magnification is great in focal length and has a large full optical length. This hinders the compactness and light weight of the reproducing apparatus, and the cost thereof cannot be reduced sufficiently.

To solve the above-noted problems peculiar to the prior art, it is an object of the present invention to provide an imaging single lens which is compact and light in weight while maintaining a good imaging performance in conformity with the purpose of its use and in which a first surface is an axis-symmetrical non-spherical surface having a radius of curvature $r_1$ in the vicinity of the optical axis, a second surface is a spherical surface having a radius of curvature $r_2$, the center thickness is d, the non-spherical shape of the first surface is a shape displaced toward the object side from the center to the marginal portion relative to a reference spherical surface of radius $r_1$, and as $p = -r_2/d$, p is 1 or a value approximate thereto.

DESCRIPTION OF THE PREFERRED EMBODIMENTS

Figure 1:
FIG. 1 schematically shows the structure of a first embodiment of the present invention and the optical path thereby.
Figures 2A, 2B, 2C:
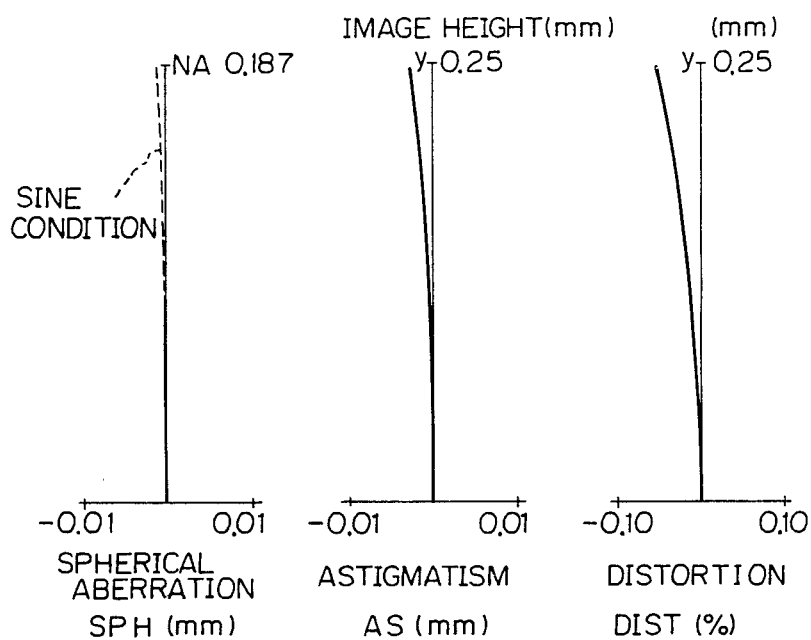
FIGS. 2A to 2C show the vertical aberrations in the first embodiment.
Figure 3A:
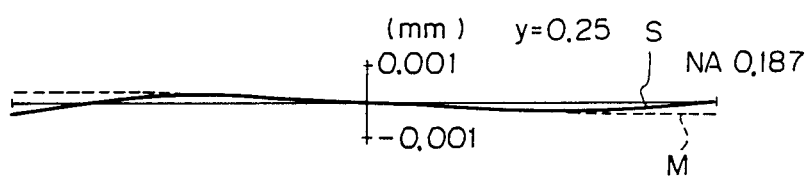
FIGS. 3A and 3B show the horizontal aberrations in the first embodiment.
Figure 3B:
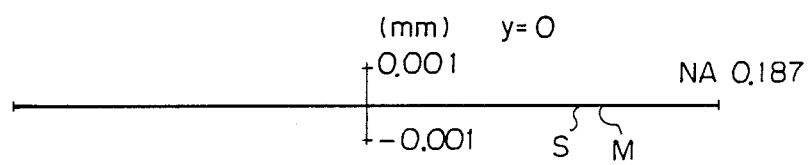

The basic construction of an embodiment of the imaging single lens according to the present invention will hereinafter be described.

A first surface is an axis-symmetrical non-spherical surface having a radius of curvature $r_1$ in the vicinity of the optical axis, a second surface is a spherical surface having a radius of curvature $r_2$, the center thickness is d, the non-spherical shape of said first surface is a shape displaced toward the object side from the center to the marginal portion relative to a reference spherical surface of radius $r_1$, and as $p \equiv -r_2/d$, p is in the range of $$0.9 < p < 1.1 \quad (1).$$

In the imaging single lens of the present invention, when the refractive index of the material of the lens is n and the distance from the first surface to the object is $-s_1$, as $q \equiv (n+1)r_1/s_1$ ($s_1 \neq 0$), it is preferable that q be in the range of $$0.9 < q < 1.1 \quad (2).$$

The bases of the above formulas (1) and (2) will hereinafter be explained.

Let it be assumed that, for convenience, the non-spherical surface shape of the first surface of the lens is represented in the following form. That is, the x-axis is chosen coincidently with the direction of travel of light on the optic axis, and the y-axis and z-axis perpendicular to the x-axis and orthogonal to each other so as to pass through the vertex of the first surface are chosen, and as $H^2 = y^2 + z^2$, it is assumed that the coordinates (x, y, z) of a point on the first surface satisfy an equation represented by $$x = (H^2/r_1)/(1 + \sqrt{1-(H/r_1)^2}) + BH^4 + CH^6 + DH^8 + EH^{10} \quad (3).$$

In equation (3), the first term of the right side in a term regarding the reference spherical surface of radius $r_1$ passing through the vertex of the first surface, and B, C, D and E are coefficients representing the degrees of non-sphericity.

According to Yoshiya Matsui: *The Lens Designing Method* (published by Kyoritsu Publishing Co., Ltd.), the third-order aberration coefficients regarding a spherical surface are described as follows:

$$I(\text{spherical aberration coefficient}) = h(hQ)^2 \left\{ h\Delta \left( \frac{1}{Ns} \right) \right\} \quad (a)$$

$$II(\text{coma coefficient}) = h(hQ)(\overline{hQ}) \left\{ h\Delta \left( \frac{1}{Ns} \right) \right\} \quad (b)$$

$$III(\text{astigmatism coefficient}) = h(\overline{hQ})^2 \left\{ h\Delta \left( \frac{1}{Ns} \right) \right\} \quad (c)$$

$$IV(\text{curvature of sagittal image plane}) = \quad (d)$$

$$III - \frac{1}{r} \Delta \left( \frac{1}{N} \right) \equiv III + p$$

$$V(\text{distortion}) = h(\overline{hQ})^2 \left\{ h\Delta \left( \frac{1}{Ns} \right) \right\} + (\overline{hQ}) \left\{ h \left( \frac{1}{Ns} \right) \right\} \quad (e)$$

where h is the incidence height of the light ray with respect to the surface, Q is Abbes invariant, N is the refractive index of the medium, $\Delta(1/Ns)$ and $\Delta(1/N)$ are the differences from the amount on the object side and the amount on the image side, respectively, with the surface as the boundary with respect to 1/Ns and 1/N, and $\overline{h}$ and $\overline{Q}$ are the incidence height and the Abbes invariant, respectively, corresponding to the principal light ray.

It is seen from equations (b) and (c) that there is the following condition as the condition for rendering the coma coefficient II and the astigmatism coefficient III into O:

$$\Delta \left( \frac{1}{Ns} \right) = 0 \quad (f)$$

From the paraxial imaging formula $$\frac{N'}{S'} = \frac{N' - N}{r} + \frac{N}{s}, \quad (g)$$

the following is given:

$$\frac{1}{N's'} = \frac{N' - N}{N'^2} \left( \frac{1}{r} \right) + \frac{N}{N'^2} \left( \frac{1}{s} \right)$$

and hence, $$\Delta \left( \frac{1}{Ns} \right) = \frac{1}{N's'} - \frac{1}{Ns}$$

$$= \frac{N' - N}{N'^2} \cdot \frac{1}{r} + \left( \frac{N}{N'^2} - \frac{1}{N} \right) \frac{1}{s}$$

and accordingly, the condition of equation (f) is $$s = \frac{N' + N}{N} r. \quad (h)$$

Particularly, if this condition is applied to the first surface of the single lens, $$s_1 = (n+1)r_1 \quad (i).$$

Accordingly, when $q \equiv (n+1)r_1/s_1$ is 1 or a value approximate thereto (for example, $0.9 < q < 1.1$), the coma and astigmatism of the first surface become well corrected. Since, in this case, I is the spherical aberration coefficient, it follows from equations (a) and (f) that the spherical aberration of the first surface also becomes well corrected.

On the other hand, it is seen from equations (b) and (c) above that there is the following condition as the condition for rendering the coma coefficient II and the astigmatism coefficient III into 0:

$$\overline{Q} = 0$$

So, from $$\overline{Q} = N' \left( \frac{1}{r} - \frac{1}{\overline{t'}} \right) = N \left( \frac{1}{r} - \frac{1}{\overline{t}} \right) = 0,$$

the following condition is given:

$$r = \overline{t} = \overline{t'} \quad (j)$$

If this condition is applied to the second surface of the single lens and the pupil is made coincident with the first surface, this corresponds to a case where the pupil paraxial ray enters from the center of curvature of the second surface, and this ray emerges toward the image side without being refracted by the second surface. In this case, t=−d and therefore, $$r_2 = -d \tag{k}$$

According, when $p = -r_2/d$ is 1 or a value approximate thereto (for example, $0.9 < p < 1.1$), the coma and astigmatism of the second surface become well corrected.

In this case, however, the spherical aberration coefficient I shown by equation (a) above does not always become approximate to 0, but rather, spherical aberration remains in the second surface. So, the non-spherical shape of the first surface is determined so that relative to the spherical aberration coefficient $I_2$ of the second surface, the spherical aberration coefficient $I_1$ of the first surface becomes $-I_2$ or a value approximate thereto. Thereby, the spherical aberration of the entire single lens can be well corrected. For this purpose, when the focal length of the single lens is f and the distance from the first surface to the image side principal plane is $0_1$ and $h_1 = s_1/(s_1+0_1)$, the non-sphericity coefficient B of the first surface in equation (3) above is determined so that $$B = -1 I_2 / 8 h_1^4 (n-1) f^3 \tag{l}$$

or that this equation (l) is substantially satisfied. Likewise, the non-sphericity coefficients C, D and E of the first surface in equation (3) above are determined so that the remaining spherical aberration of the single lens is eliminated. Here, the value of $I_2$ is always positive and therefore, B is of a negative value. Thus, the non-spherical shape of the first surface becomes displaced toward the object side.

Some specific embodiments of the imaging single lens according to the present invention will be shown below.

In the lists below, as regards the measure unit of the numerical values, f, s, r, d, B, C, D and E are based on mm, and values calculated with f as f=1 are used for aberration coefficients I, II, III, p and I (annular spherical aberration).

EMBODIMENT 1

| f = 5.68, NA (Numerical Aperture) = 0.187, Magnification $\beta$ = −1/4.5 | |
|---|---|
| $s_1 = -28.821$ | |
| $r_1 = -10.51116$, | $r_2 = -3.42566$ |
| d = 3.42566, | n = 1.74192 |
| B = $-1.00346 \times 10^{-2}$, | C = $-1.00972 \times 10^{-3}$ |
| D = $-1.24189 \times 10^{-4}$, | E = $-4.47193 \times 10^{-5}$ |
| I = II = III = I = 0, | P = 0.47605 |
| p = q = 1 | |

The optical path of the present embodiment is shown in FIG. 1, and the aberrations in the present embodiment are shown in FIGS. 2A–2C and 3A–3B.

EMBODIMENT 2

| f = 5.68, NA = 0.187, Magnification $\beta$ = −1/4.5 | |
|---|---|
| $s_1 = -31.88$ | |
| $r_1 = -6.61861$, | $r_2 = -3.07513$ |
| d = 3.02, | n = 1.74192 |
| B = $-1.3563 \times 10^{-2}$ | C = $-2.13739 \times 10^{-3}$ |
| D = $6.54352 \times 10^{-5}$, | E = $-2.35052 \times 10^{-4}$ |
| I = 0.102465, | II = −0.027349 |
| III = −0.077439, | P = 0.421188 |
| I = −47.16 | |

| f = 5.68, NA = 0.187, Magnification $\beta$ = −1/4.5 | |
|---|---|
| p = 1.018, | q = 0.5693 |

The aberrations in the present embodiment are shown in FIGS. 4A–4C and 5A–5B.

EMBODIMENT 3

| f = 5.0, NA = 0.2, Magnification $\beta$ = −1/5 | |
|---|---|
| $s_1 = -27.869$ | |
| $r_1 = -10.15999$, | $r_2 = -3.07073$ |
| d = 3.07073, | n = 1.74298 |
| B = $-1.39112 \times 10^{-2}$, | C = $-1.72908 \times 10^{-3}$ |
| D = $-2.53571 \times 10^{-4}$, | E = $-1.24053 \times 10^{-4}$ |
| I = II = III = I = 0, | P = 0.48431 |
| p = q = 1 | |

The aberrations in the present embodiment are shown in FIGS. 6A–6C and 7A–7B.

EMBODIMENT 4

| f = 10.0, NA = 0.1037, Magnification $\beta$ = −1 | |
|---|---|
| $s_1 = -15.61246$ | |
| $r_1 = -5.61246$, | $r_2 = -4.38754$ |
| d = 4.38754, | n = 1.78175 |
| B = $-5.06935 \times 10^{-3}$, | C = $-4.32588 \times 10^{-4}$ |
| D = $-3.61635 \times 10^{-5}$, | E = $-1.20184 \times 10^{-5}$ |
| I = II = III = I = 0, | P = 0.21825 |
| p = q = 1, | |

Figure 8:
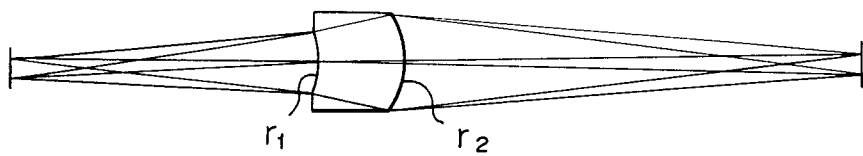
FIG. 8 schematically shows the structure of a fourth embodiment of the present invention and the optical path thereby.
Figures 9A, 9B, 9C:
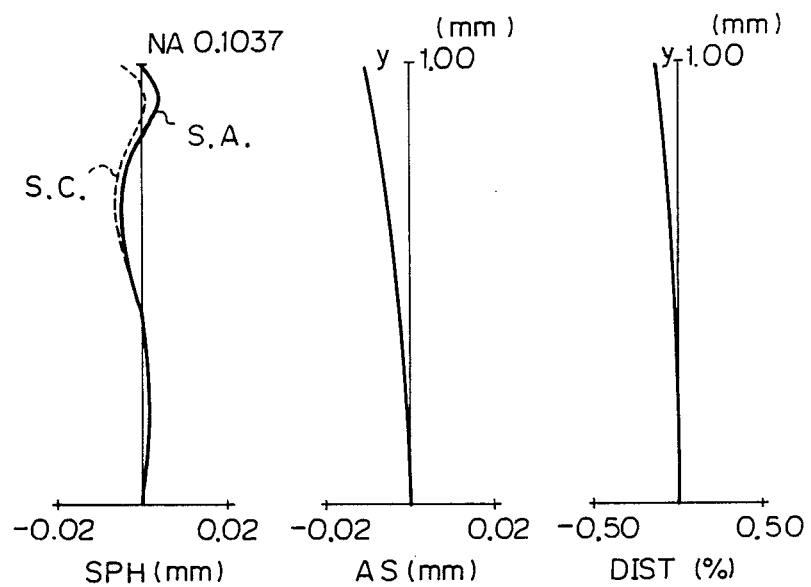
FIGS. 9A to 9C show the vertical aberrations in the fourth embodiment.
Figure 10A:
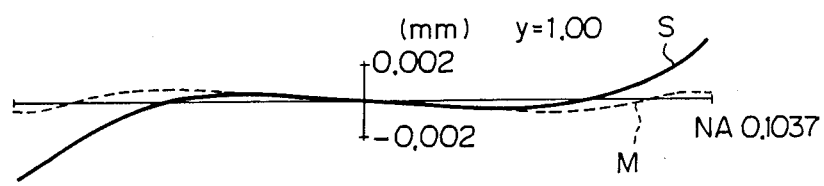
FIGS. 10A and 10B show the horizontal aberrations in the fourth embodiment.
Figure 10B:
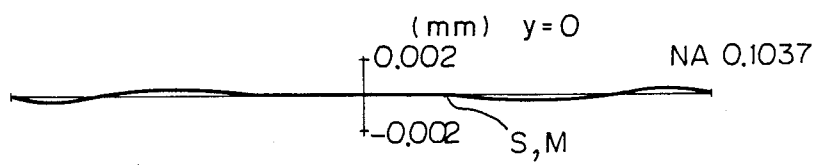

The optical path of the present embodiment is shown in FIG. 8, and the aberrations in the present embodiment are shown in FIGS. 9A–9C and 10A–10B.

EMBODIMENT 5

| f = 5.0, NA = 0.03, Magnification $\beta$ = −4.5 | |
|---|---|
| $s_1 = -4.02937$ | |
| $r_1 = -1.48502$, | $r_2 = -1.48501$ |
| d = 1.48501, | n = 1.71335 |
| B = $-1.15432 \times 10^{-1}$, | C = $-1.01250 \times 10^{-1}$ |
| D = $-9.18271 \times 10^{-2}$, | E = $-1.67905 \times 10^{-1}$ |
| I = II = III = P = I = 0 | |
| p = q = 1 | |

Figure 11:
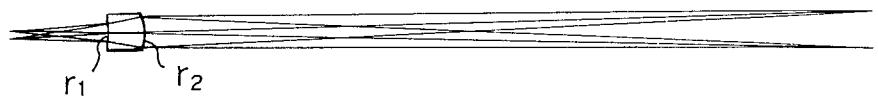
FIG. 11 schematically shows the structure of a fifth embodiment of the present invention and the optical path thereby.
Figures 12A, 12B, 12C:
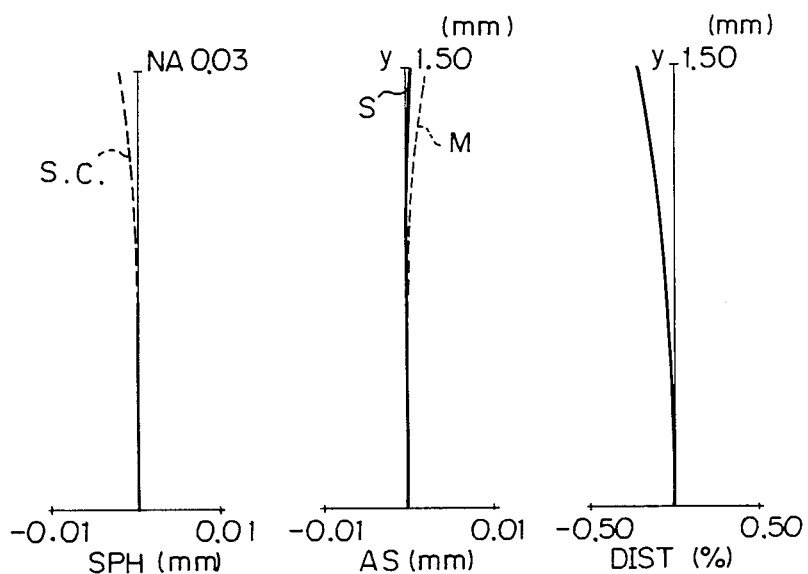
FIGS. 12A to 12C show the vertical aberrations in the fifth embodiment.
Figure 13A:
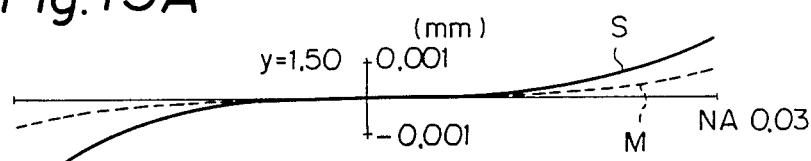
FIGS. 13A and 13B show the horizontal aberrations in the fifth embodiment.
Figure 13B:
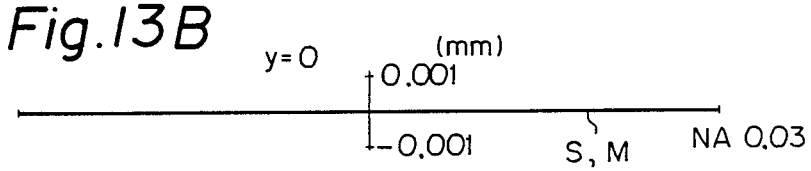
Figures 14A, 14B, 14C:
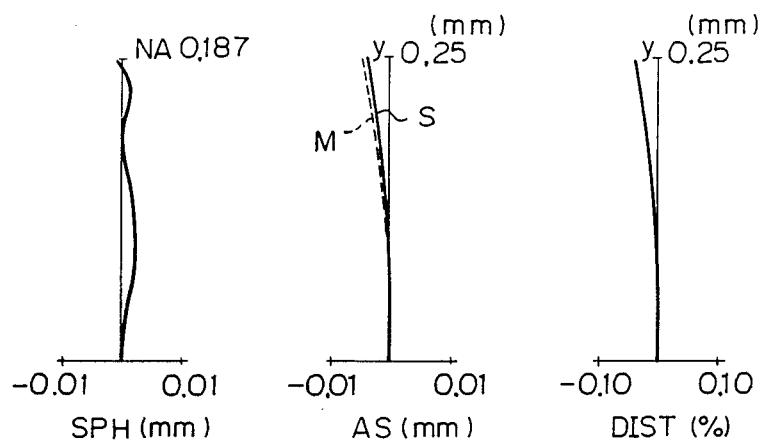
FIGS. 14A to 14C show the vertical aberrations in a sixth embodiment of the present invention.
Figure 15A:
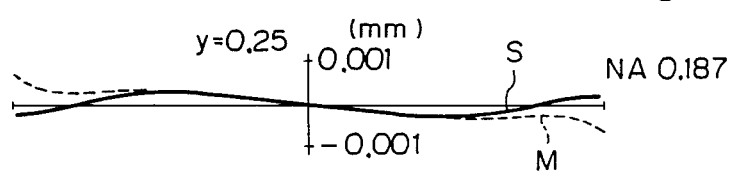
FIGS. 15A and 15B show the horizontal aberrations in the sixth embodiment.
Figure 15B:
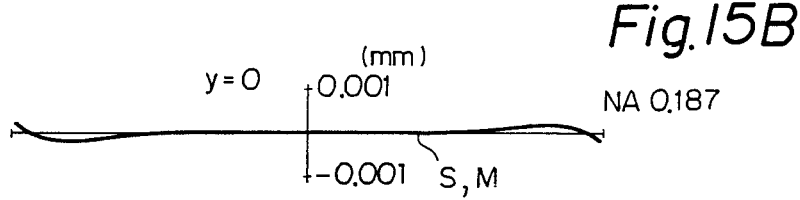
Figures 16A, 16B, 16C:
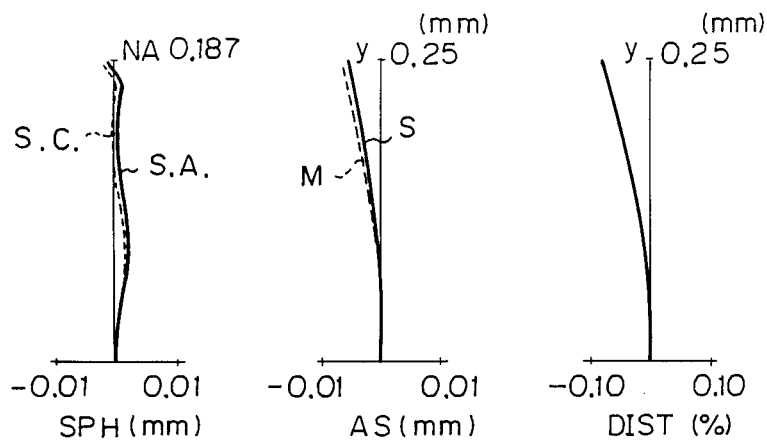
FIGS. 16A to 16C show the vertical aberrations in a seventh embodiment of the present invention.
Figure 17A:
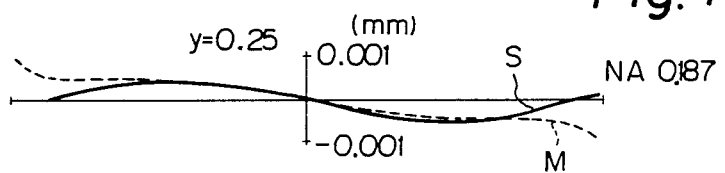
FIGS. 17A and 17B show the horizontal aberrations in the seventh embodiment.
Figure 17B:
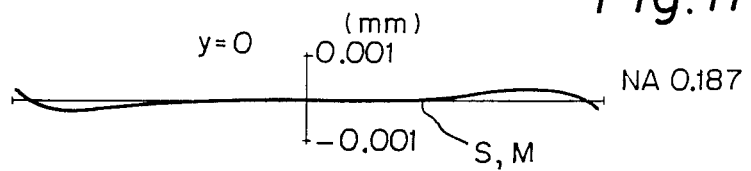
Figures 18A, 18B, 18C:
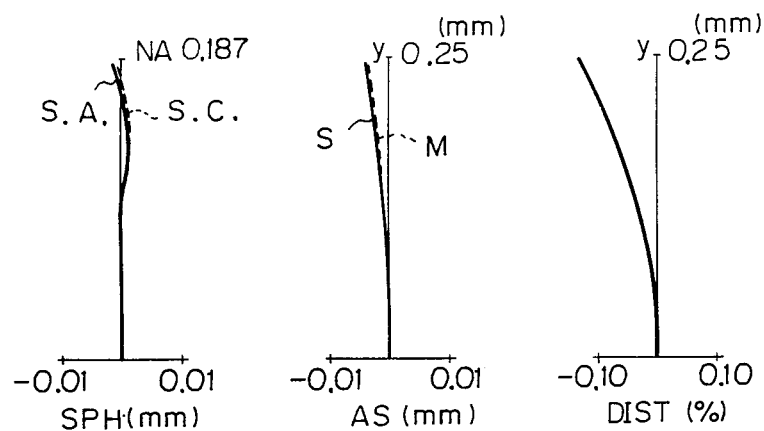
FIGS. 18A to 18C show the vertical aberrations in an eighth embodiment of the present invention.
Figure 19A:
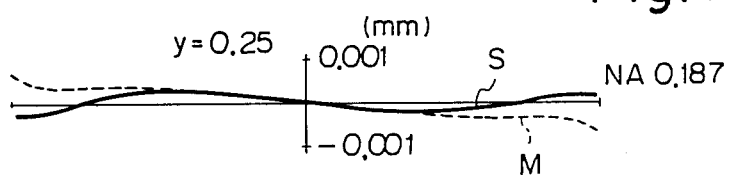
FIGS. 19A and 19B show the horizontal aberrations in the eighth embodiment.
Figure 19B:
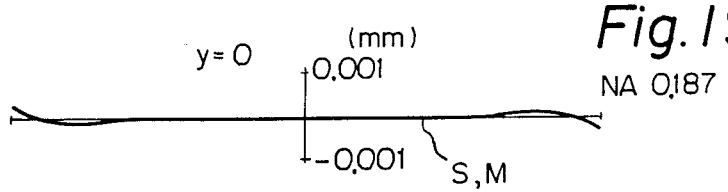
Figures 20A, 20B, 20C:
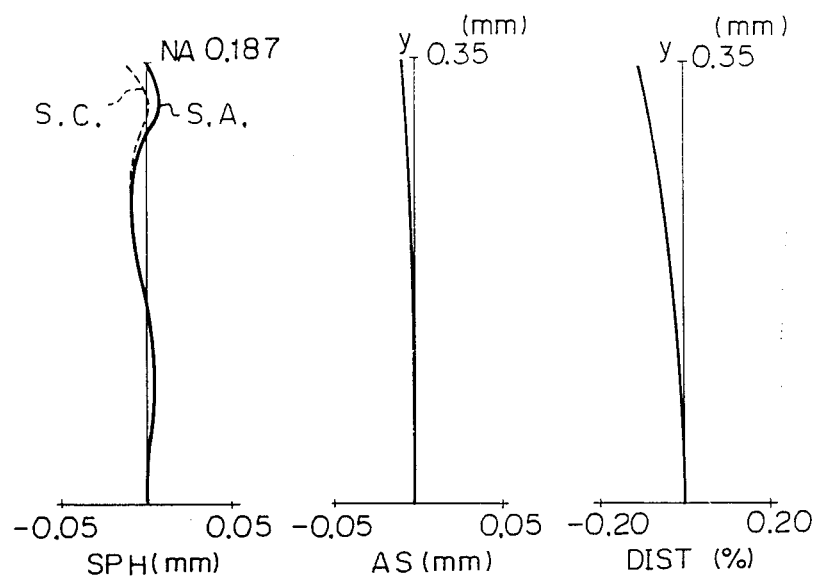
FIGS. 20A to 20C show the vertical aberrations in a ninth embodiment of the present invention.
Figure 21A:
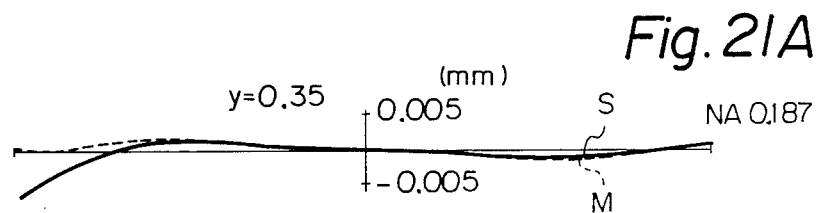
FIGS. 21A and 21B show the horizontal aberrations in the ninth embodiment.
Figure 21B:
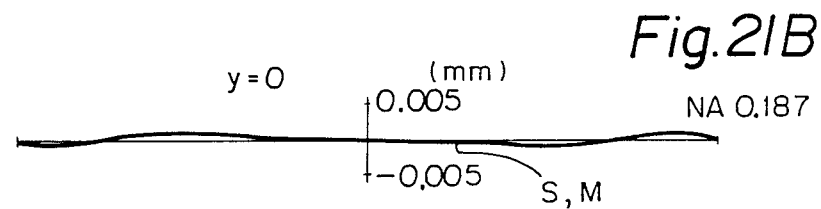

The optical path of the present embodiment is shown in FIG. 11, and the aberrations in the present embodiment are shown in FIGS. 12A–12C and 13A–13B.

EMBODIMENT 6

| f = 5.8, NA = 0.187, Magnification $\beta$ = −1/4.5 | |
|---|---|
| $s_1 = -30.00$ | |
| $r_1 = -22.21572$, | $r_2 = -2.59257$ |
| d = 2.6, | n = 1.48506 |
| B = $-1.63811 \times 10^{-2}$, | C = $-1.91415 \times 10^{-3}$ |
| D = $-2.87309 \times 10^{-4}$, | E = $-1.94254 \times 10^{-4}$ |
| p = 0.997, q = 1.840 | |

The aberrations in the present embodiment are shown in FIGS. 14A–14C and 15A–15B.

EMBODIMENT 7

| f = 4.0, NA = 0.187, Magnification $\beta$ = −1/4.5 | |
| --- | --- |
| $s_1$ = −20.684 | |
| $r_1$ = −23.23203, | $r_2$ = −1.83726 |
| d = 1.85, | n = 1.48506 |
| B = −4.62666 × 10$^{-2}$, | C = −9.41678 × 10$^{-3}$ |
| D = −5.47603 × 10$^{-3}$, | E = −2.70961 × 10$^{-3}$ |
| p = 0.993, | q = 2.454 |

The aberrations in the present embodiment are shown in FIGS. 16A–16C and 17A–17B.

EMBODIMENT 8

| f = 3.5, NA = 0.187, Magnification $\beta$ = −1/4.5 | |
| --- | --- |
| $s_1$ = −17.766 | |
| $r_1$ = −5.7298, | $r_2$ = −2.0592 |
| d = 2.05, | n = 1.74192 |
| B = −4.57731 × 10$^{-2}$, | C = −1.51776 × 10$^{-2}$ |
| D = 2.43491 × 10$^{-5}$, | E = −0.712867 × 10$^{-3}$ |
| p = 1.004, | q = 0.8843 |

The aberrations in the present embodiment are shown in FIGS. 18A–18C and 19A–19B.

EMBODIMENT 9

| f = 5.0, NA = 0.187, Magnification $\beta$ = −1/4.5 | |
| --- | --- |
| $s_1$ = −28.36587 | |
| $r_1$ = −11.41254, | $r_2$ = −2.12345 |
| d = 2.12345, | n = 1.4855 |
| B = −2.96163 × 10$^{-2}$, | C = −5.71165 × 10$^{-3}$ |
| D = −2.90136 × 10$^{-4}$, | E = −1.86864 × 10$^{-5}$ |
| I = II = III = 0, | P = 0.62638 |
| p = q = 1.0 | |

The aberrations in the present embodiment are shown in FIGS. 20A–20C and 21A–21B.

In the above embodiments, the object and the image are used for convenience and in the actual use, the object side and the image side may of course be reversed to each other.

As can be seen from the aberration graphs, these embodiments have well corrected aberration characteristics.

In the imaging single lens of the present invention as described above, spherical aberration, coma and astigmatism are well corrected over a relatively wide field of view, and thus, where the light used is substantially monochromatic, it is possible to realize compactness and light weight of the imaging optical system while maintaining a good imaging performance.

I claim:

1. An imaging single lens in which a first surface is an axis-symmetrical non-spherical surface having a radius of curvature $r_1$ in the vicinity of the optical axis, a second surface is a convex spherical surface having a radius of curvature $r_2$, the center thickness is d, the non-spherical shape of said first surface is a shape displaced outwardly from the central portion to the marginal portion relative to a reference spherical surface of radius $r_1$, and as $p \equiv -r_2/d$, p is 1 or a value approximate to 1, when $0.9 < p < 1.1$.

2. An imaging single lens in which a first surface is an axis-symmetrical non-spherical surface having a radius of curvature $r_1$, in the vicinity of the optic axis, a second surface is a convex spherical surface having a radius of curvature $r_2$, the center thickness is d, the non-spherical shape of said first surface is a shape displaced outwardly from the central portion to the marginal portion relative to a reference spherical surface of radius $r_1$, and as $p \equiv -r_2/d$, p is 1 or a value approximate to 1, wherein when the refractive index of the material of said lens is n and the distance from said first surface to the object is $-s_1$, as $q \equiv (n+1)r_1/s_1$ ($s_1 \neq 0$), q is 1 or a value approximate to 1, and said first surface is a concave surface as a whole.

3. An imaging single lens according to claim 2, wherein $0.9 < q < 1.1$.

4. An imaging single lens in which a first surface is an axis-symmetrical non-spherical surface having a radius of curvature $r_1$ in the vicinity of the optic axis, a second surface is a convex spherical surface having a radius of curvature $r_2$, the center thickness is d, the non-spherical shape of said first surface is a shape displaced outwardly from the central portion to the marginal portion relative to a reference spherical surface of radius $r_1$, and as $p \equiv -r_2/d$, p is 1 or a value approximate to 1, wherein the non-spherical shape of said first surface is determined so that relative to the spherical aberration coefficient $I_2$, of said second surface, the spherical aberration coefficient $I_1$ of said first surface is $-I_2$, or a value approximate thereto.

5. An imaging signal lens comprising:
a first surface, said first surface being an axis-symmetrical aspherical surface having a radius of curvature $r_1$ in the vicinity of an optical axis; and
a second surface, said second surface being a substantially convex spherical surface having a radius of curvature $r_2$,
wherein q is in the range of $0.9 < q < 1.1$, where n is a refractive index of material of the lens, $-s_1$ is a distance from said first surface to an object when said single lens is used at a reduced magnification, and $q \equiv (n+1)r_1/s_1$, with $s_1 \neq 0$.

6. An imaging single lens comprising:
a first surface, said first surface being an axis-symmetrical aspherical surface having a radius of curvature $r_1$ in the vicinity of an optical axis; and
a second surface, said second surface being a substantially convex spherical surface having a radius of curvature $r_2$,
wherein p is 1 or a value approximate to 1, where d is a center thickness between said first and second surfaces and $p \equiv |r_2/d|$, and a pupil of the lens is in the vicinity of said first surface, and wherein $0.9 < p < 1.1$.

7. An imaging single lens according to claim 6, wherein q is 1 or a value approximate to 1, where n is a refractive index of material of the lens, $-s_1$ is a distance from said first surface to an object and $q \equiv (n+1)/r_1/s_1$ ($s_1 \neq 0$), and said first surface is a concave surface as a whole.

8. An imaging single lens according to claim 7, wherein $0.9 < p < 1.1$.

9. An imaging single lens comprising:
a first surface, said first surface having a radius of curvature $r_1$ at least in the vicinity of an optical axis; and
a second surface, said second surface being a substantially convex spherical surface having a radius of curvature $r_2$; and
wherein p is in the range of $0.9 < p < 1.1$ where d is a center thickness between said first and second surfaces and $p \equiv |r_2/d|$.

10. An imaging single lens according to claim 9 wherein said first surface is an aspherical surface having the radius of curvature $r_1$ in the vicinity of the optical axis.

11. An imaging single lens according to claim 10, wherein said first surface is a concave surface.

* * * * *

UNITED STATES PATENT AND TRADEMARK OFFICE
CERTIFICATE OF CORRECTION

PATENT NO. : 4,765,725                     Page 1 of 2
DATED : August 23, 1988
INVENTOR(S) : SHIGEYUKI SUDA It is certified that error appears in the above-identified patent and that said Letters Patent is hereby corrected as shown below: Title page:

AT [57] IN THE ABSTRACT

Line 1, "which perfectly," should read --which, preferably,

COLUMN 2

Figures 4A, 4B, 4C:
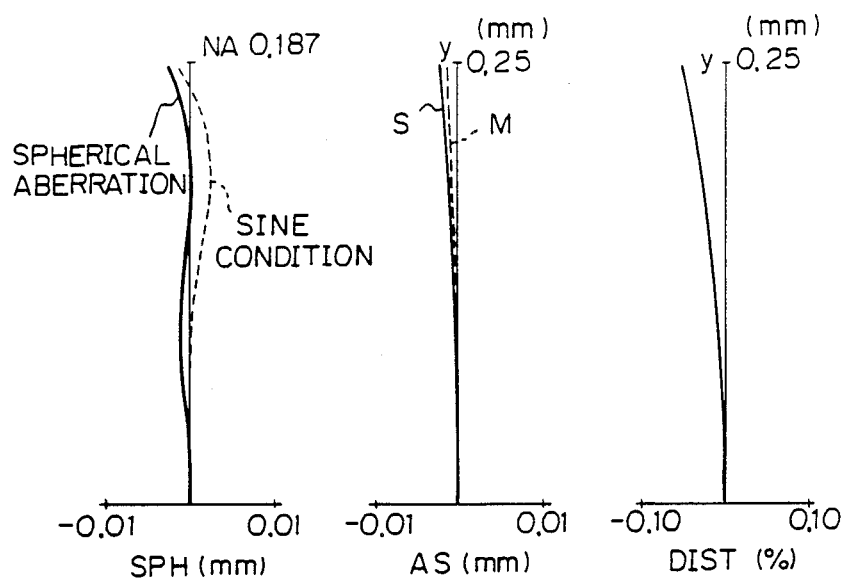
FIGS. 4A and 4C show the vertical aberrations in a second embodiment of the present invention.
Figure 5A:
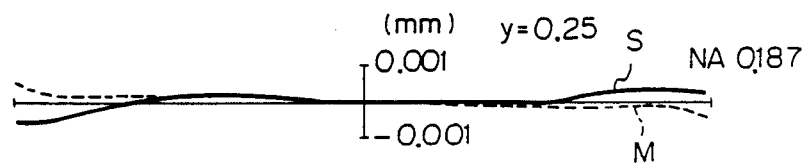
FIGS. 5A and 5B show the horizontal aberrations in the second embodiment.
Figure 5B:
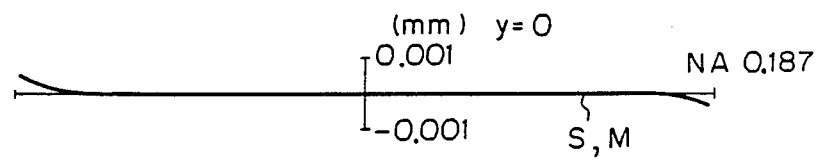
Figures 6A, 6B, 6C:
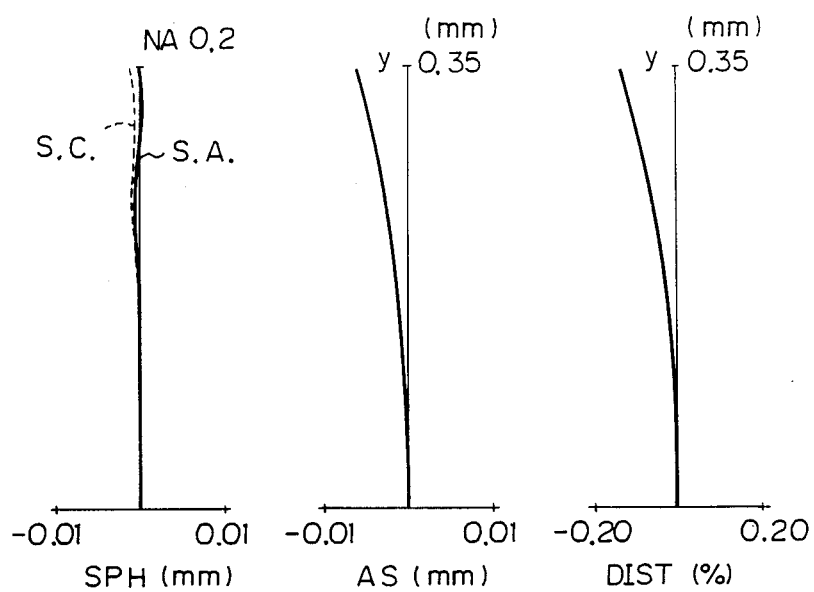
FIGS. 6A to 6C show the vertical aberrations in a third embodiment of the present invention.
Figure 7A:
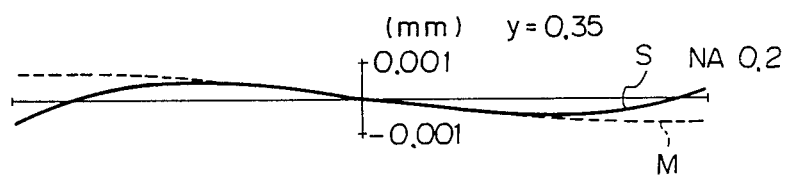
FIGS. 7A and 7B show the horizontal aberrations in the third embodiment.
Figure 7B:
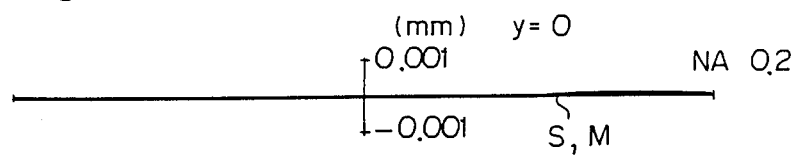

Line 18, "FIGS. 4A and 4C" should read --FIGS. 4A to 4C--.

COLUMN 3

Line 29, "in" should read --is--.

COLUMN 4

Line 4, "into O:" should read --into 0:--.

COLUMN 5

Line 6, "According," should read --Accordingly,--.
   Line 40, "and I" should read --and I--.

COLUMN 6

Line 13, "$S_1=-27.869$" should read --$s_1=-27.869$--.
   Line 43, "Magnification $\beta = -4.5$" should read
      --Magnification $\beta = -1/4.5$--.

UNITED STATES PATENT AND TRADEMARK OFFICE
CERTIFICATE OF CORRECTION

PATENT NO. : 4,765,725
DATED : August 23, 1988
INVENTOR(S) : SHIGEYUKI SUDA

It is certified that error appears in the above-identified patent and that said Letters Patent is hereby corrected as shown below:

COLUMN 7

Line 59, "when" should read --wherein--.

Signed and Sealed this

Fourth Day of April, 1989

Attest:

DONALD J. QUIGG

*Attesting Officer*                    *Commissioner of Patents and Trademarks*